United States Patent [19]

Kowal

[11] Patent Number: 5,157,670
[45] Date of Patent: Oct. 20, 1992

[54] ERROR CORRECTION CODE INTERRUPTION SYSTEM

[75] Inventor: Stephen J. Kowal, Boulder, Colo.

[73] Assignee: Avasem Corporation, San Jose, Calif.

[21] Appl. No.: 846,515

[22] Filed: Mar. 4, 1992

Related U.S. Application Data

[63] Continuation of Ser. No. 445,538, Dec. 4, 1989.

[51] Int. Cl.⁵ .......................................... H03M 13/00
[52] U.S. Cl. .................................................... 371/40.1
[58] Field of Search .................... 371/40.1, 37.1, 10.1, 371/10.2, 21.1, 37.5, 38.1; 358/342

[56] References Cited

U.S. PATENT DOCUMENTS

| | | | |
|---|---|---|---|
| 4,107,650 | 8/1978 | Luke et al. | 371/39.1 |
| 4,706,249 | 11/1987 | Nakagawa et al. | 371/40.1 |
| 4,726,021 | 2/1988 | Horiguchi et al. | 371/40.1 |
| 4,730,321 | 3/1988 | Machado | 371/37.5 |
| 4,783,705 | 11/1988 | Moon et al. | 364/200 |
| 4,791,622 | 12/1988 | Clay et al. | 369/54 |
| 4,796,110 | 1/1989 | Glass et al. | 371/37.5 |
| 4,819,153 | 4/1989 | Graham et al. | 364/200 |
| 4,912,695 | 3/1990 | Senshu | 371/38.1 |
| 4,992,885 | 2/1991 | Yoshio | 358/342 |
| 5,010,417 | 4/1991 | Yoshio et al. | 358/342 |
| 5,016,113 | 5/1991 | Yamashita et al. | 358/342 |

*Primary Examiner*—Robert W. Beausoliel
*Assistant Examiner*—Phung My Chung
*Attorney, Agent, or Firm*—James R. Young

[57] ABSTRACT

Disclosed is a disk controller having an interruptable error correction code circuit for accumulating a remainder during the writing to or reading from data storage media in a disk storage device. An ECC clock latches each bit of data into the circuit when data is being transferred. The ECC clock is controlled by an ECC clock control circuit that monitors sector data and redundancy data transfers to interrupt the ECC clock when sector data transfer is suspended before redundancy data transfer is started. The ECC clock is then allowed to resume after the suspension is complete. Sector data transfer is suspended while the read/write head of the data storage device is passing a defect in the media of the storage device. Since the ECC clock control circuit interrupts the ECC clock while data transfer is suspended, the remainder accumulation will be interrupted while the defect is being passed. While the remainder accumulation is interrupted, the circuit acts as if data is not being transferred during this time. Thus, the defect can be skipped without the need to write redundancy data before the defect and then write additional fields of redundancy data until termination of the data field. ECC remainder accumulation is also halted during zone recording while the read/write head is passing sector positioning information. This allows data to be split between sectors without the need to add additional redundancy fields.

10 Claims, 5 Drawing Sheets

ERROR CORRECTION CODE INTERRUPTION SYSTEM

This Application is a continuation of application Ser. No. 07/445,538 filed Dec. 4, 1989.

BACKGROUND OF THE INVENTION

The present invention relates to data storage and data communications systems, and more particularly to rotating disk data storage devices. Even more particularly, the present invention relates to error correction systems used within the controllers of disk data storage devices and data communication systems.

Since the advent of digital computing techniques, attention has focused on methods for reducing errors in data. Such errors may be attributable to transient conditions in a computing apparatus or transmission channel, called "soft" errors; or they may be recurrent errors, such as those resulting from defects in data storage media, etc., called "hard" errors. When the data storage media has a small defect within a track of data, modern controllers can skip over the defective area.

Rotating disk data storage devices are typically organized in a series of tracks, with the read/write head of such devices being movable between tracks. Within each track data is stored in sectors, and typically each sector holds a consistent number of bytes. While the media is being formatted, it is also analyzed to determine where defect areas are located. Each sector has an ID field, and the integrity of the sector is coded within the ID field of each sector. When the data is being written or read, these defective sectors can be skipped.

Prior art circuits can detect that a defect area is approaching, and write, prior to the defect, the accumulated Error Correction Code (ECC) Redundancy data field for the partial sector data field written up to the point of the defect. After the defect, these prior art circuits accumulate a second field of redundancy data which is then written after the remaining data in the sector. Thus when a defect exists in a data sector, data written in that sector is written in two separate data packets, each having its own error correction code redundancy field. Reading this information requires extra firmware in the controller to handle multiple redundancy fields within a sector. Also, multiple redundancy fields require extra disk space for storage and thus reduce the amount of usable data that can be written on a track.

This problem is exacerbated if multiple defects occur within a sector, so most prior art techniques simply mark any sector having a defect as unusable. They then substitute another sector, located elsewhere on the disk, for the defective sector. This causes a significant reduction in performance each time a data transfer with the defective sector is attempted, since the drive must find the substitute sector in order to accomplish the transfer.

Increasingly, data is being written using zone recording, where the data is written with a constant linear density on the media. That is, data written on the outside tracks of the media must be written at a higher frequency in order to maintain the same recording density on each track, since the outside tracks pass under the read/write heads at a higher rate of speed. This increases the amount of data that can be written on the outside tracks. Servo positioning information, however, is typically written in fixed bands radiating out from the center of the disk, so there are the same number of physical sector areas on each track regardless of the density being written. Thus, to write more data on the outside tracks requires that more data be written in the data field of each physical sector area, and often requires that some data fields contain partial data packets. That is, an outside physical sector area will contain more data than a sector area near the center of the disk, but not necessarily an integer multiple of the amount of data contained in an inside sector, therefore sector data will span across an intervening servo field. In these cases, the data is broken into multiple packets, and in prior art circuits, each packet must have a redundancy data field stored with it.

It is thus apparent that there is a need in the art for an improved method or apparatus which allows data to skip a defective area of the media without accumulating and storing multiple redundancy fields. There is a further need in the art for an apparatus and method that will allow data to span a servo field between adjacent physical sector areas without requiring that multiple redundancy data fields be accumulated and stored.

SUMMARY OF THE INVENTION

It is an object of the present invention to provide an apparatus and method that allows data to be written to and read from a rotating data storage media having defects within a sector.

It is another object of the invention to suspend accumulation of the error correcting code redundancy remainder while such defect is being skipped.

It is yet another object of the invention to suspend accumulation of the error correcting code remainder while certain servo and/or synchronization data is being skipped.

It is a further object to require only a single field of error correcting code redundancy data for a data sector regardless of its relative position on the disk or required partitioning.

A still further object is to require only a single field of error correcting code redundancy data for a data sector that spans a servo field within a track of such media.

Still another object is to reduce the amount of firmware in the data storage device controller.

The above and other objects are accomplished in a disk controller having an error correction code circuit for accumulating a remainder during the writing to or reading from data storage media in a disk storage device. An ECC clock latches each bit of data into the circuit when data is being transferred. The ECC clock is controlled by an ECC clock control circuit that monitors sector data and redundancy data transfers to interrupt the ECC clock when sector data transfer is suspended before redundancy data transfer is started. The ECC clock is then allowed to resume after the suspension is complete.

Sector data transfer will be suspended while the read/write head of the data storage device is passing a defect or servo positioning area on the media of the storage device. Since the ECC clock control circuit interrupts the ECC clock while data transfer is suspended, the remainder accumulation will be interrupted while the area is being passed. While the remainder accumulation is interrupted, the circuit does not respond to disk activity as data is not being transferred during this time. Thus, the area can be skipped without the need to write redundancy data before the area and then write a second field of redundancy data after the next data packet, to complete the sector.

ECC remainder accumulation is also halted during zone recording while the read/write head is passing sector positioning and synchronization information. This allows data to be split between physical sectors on the disk without the need for multiple redundance fields in each data segment.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
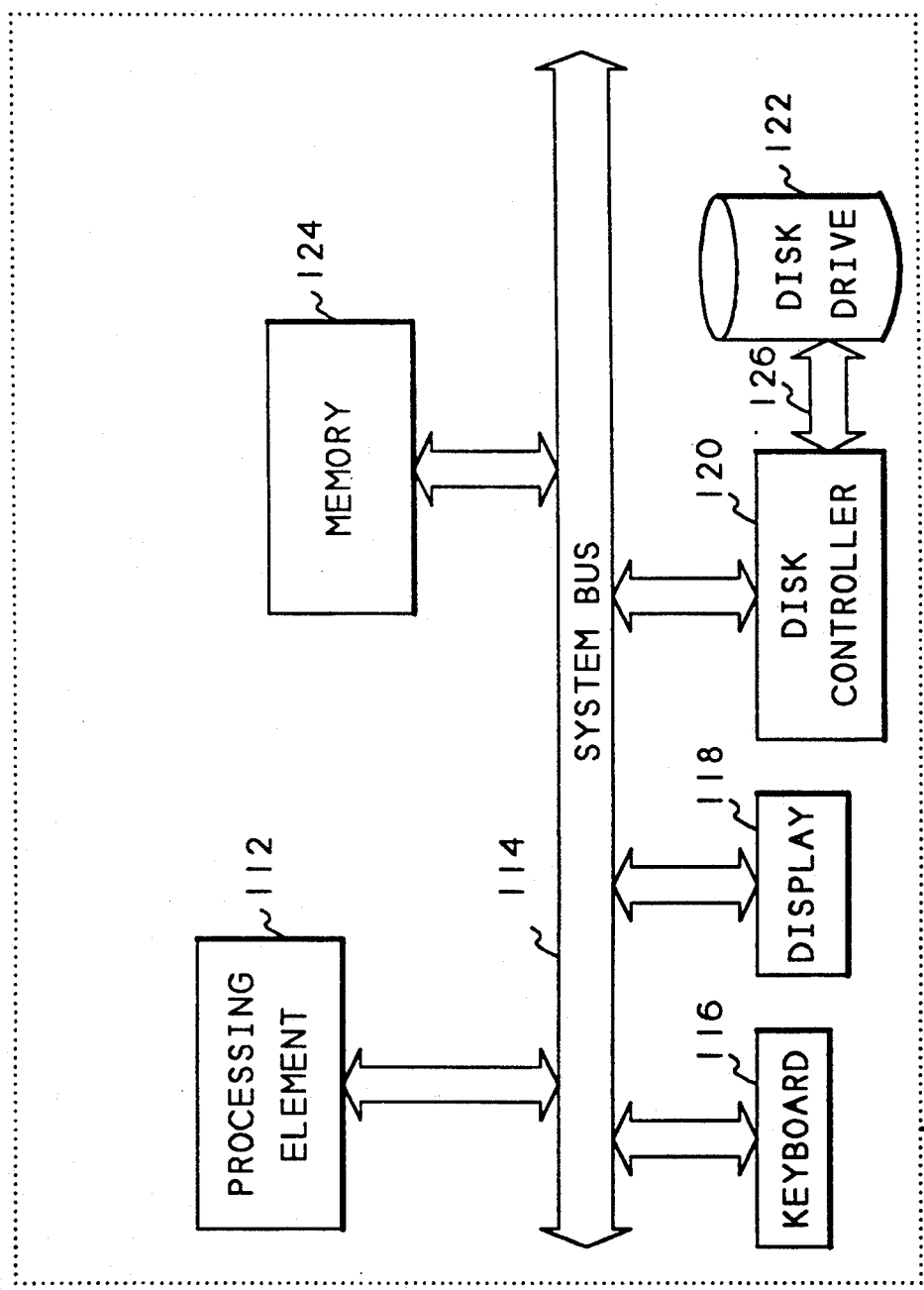
FIG. 1 is a block diagram of a computer system employing the present invention.

FIG. 1 shows a block diagram of a computer system that incorporates the Error Correction Code Interruption System of the present invention. Referring now to FIG. 1, a computer system 110 is shown having a processing element 112. The processing element 112 communicates with other elements of the system through a system bus 114. A user inputs information to the computer system 110 through a keyboard 116 attached to the system bus 114, and the computer system 110 outputs information to a user through a display 118 attached to the system bus 114. The processing element receives instructions from a memory 124, which also contains any temporary storage used by the processing element 112. Longer term storage is provided by disk 122 which is controlled by a disk controller 120 attached to the system bus 114. The Error Correction Code Interruption System apparatus and method of the present invention is contained within the disk controller 120.

Figure 2:
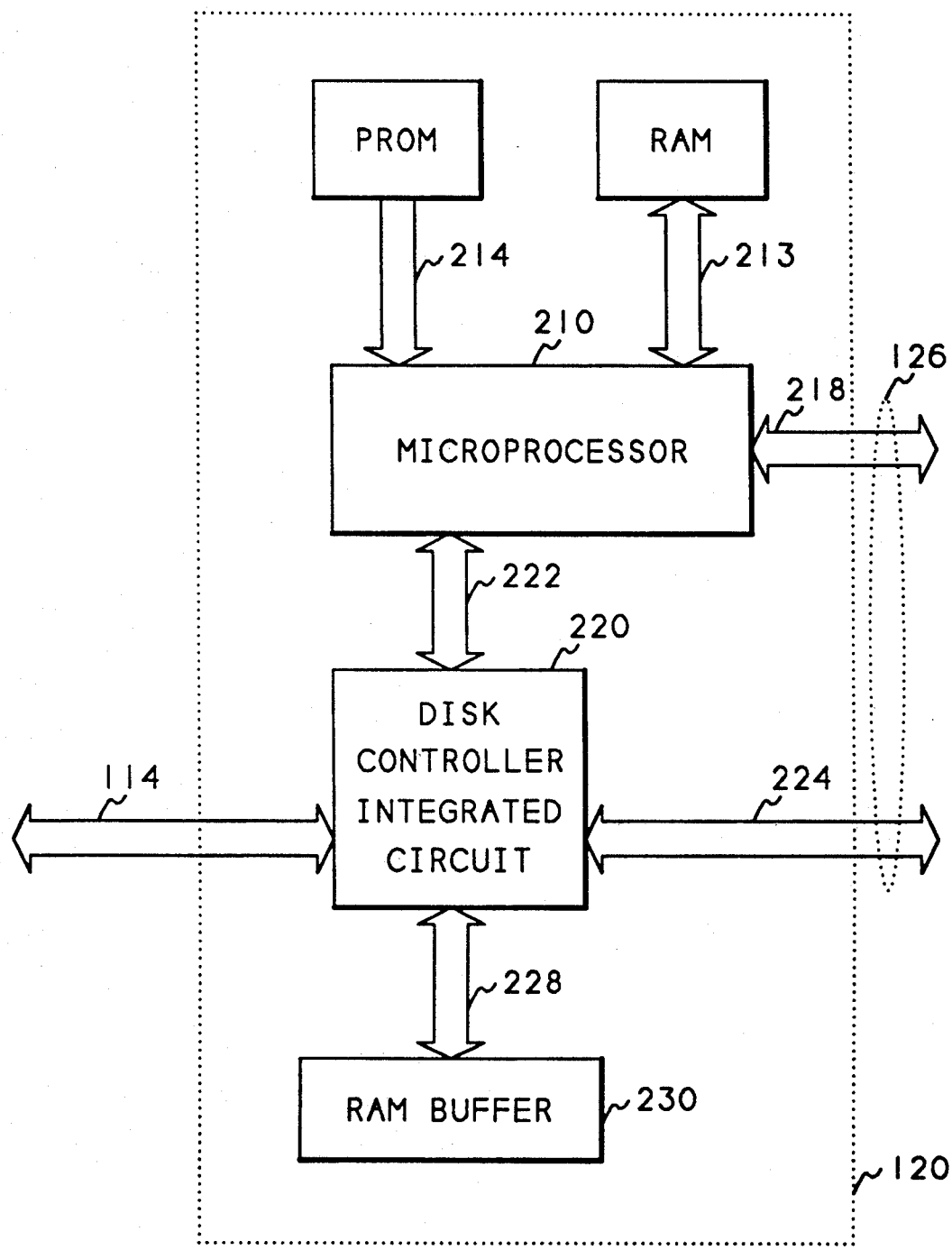
FIG. 2 is a block diagram of the disk control unit of FIG. 1.

FIG. 2 shows a block diagram of the disk controller 120 (FIG. 1). Referring now to FIG. 2, the disk controller 120 contains a microprocessor 210, a RAM memory 211 and a PROM memory 212. The microprocessor receives instructions from the PROM memory 212 via a bus 214. These instructions allow the microprocessor to guide overall controller and disk drive operations. RAM 211, via bus 213, provides temporary data storage for the microprocessor. The microprocessor 210 communicates with the host computer through bus 222 and the disk controller integrated circuit 220, which allows the microprocessor 210 to access the system bus 114. This provides a means for the microprocessor 210 to interpret commands from, and return status to, the processing element 112. The microprocessor 210 may also communicate with a RAM data buffer 230 via the disk controller integrated circuit 220 and bus 228 to allow the microprocessor 210 to correct errors in data transferred from the disk 122 (FIG. 1). The microprocessor handles the control and low speed operations between the disk 122 (FIG. 1) and the system bus 114 (FIG. 1).

A disk controller integrated circuit 220 contains the logic necessary to perform the high speed data transfers to and from the disk, including the Error Correction Code logic and the ECC interruption system circuit of the present invention. It communicates with the microprocessor 210 over a bus 222, and to the disk over the disk data bus 224. The disk controller IC 220 transfers data to and from a RAM data buffer 230 via a bus 228. The Ram data buffer 230 stores data in transit between the system bus 114 and the disk 122, and provides for speed matching between the memory 124 and the disk 122.

Figure 3:
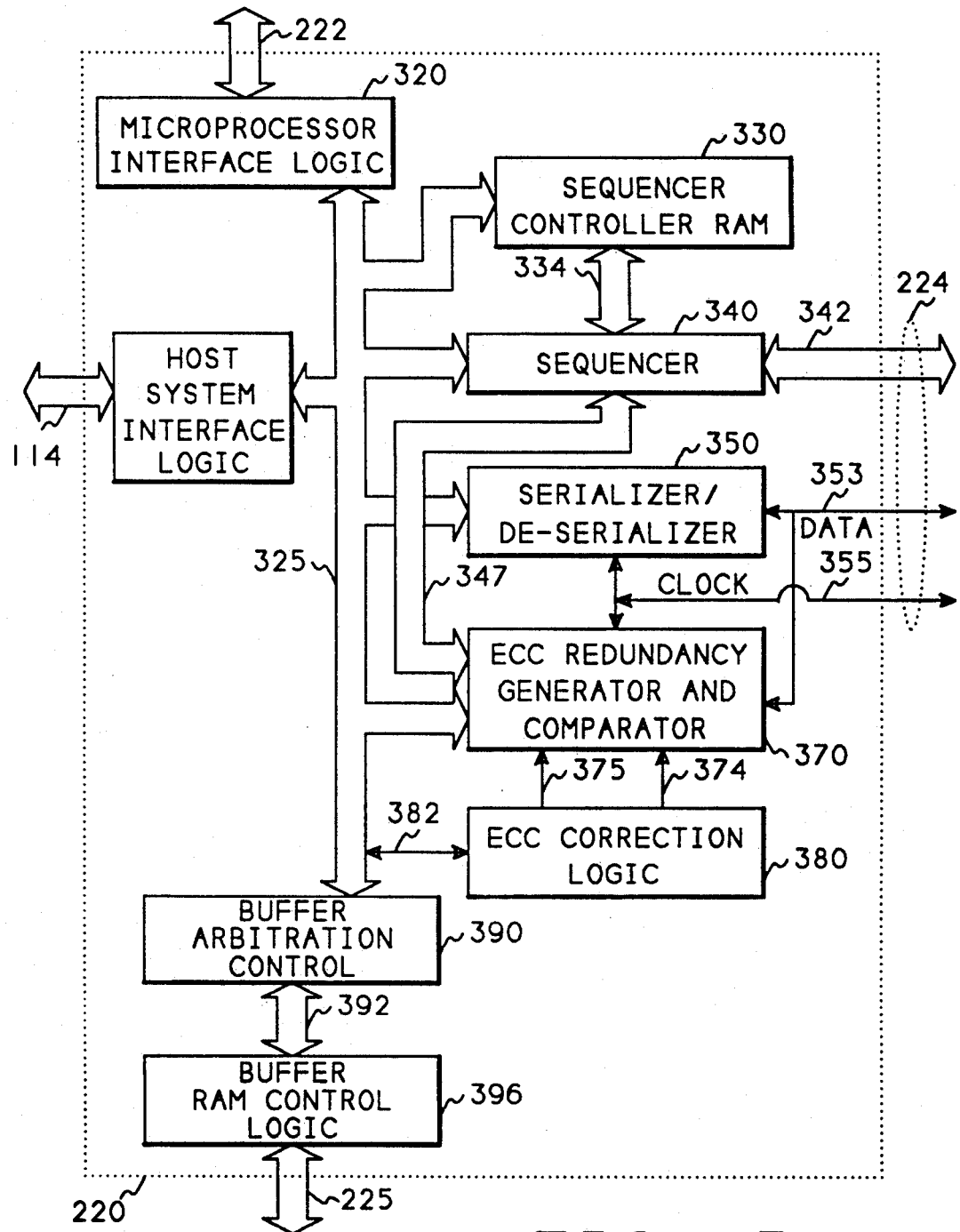
FIG. 3 is a block diagram of the disk controller integrated circuit of FIG. 2.

FIG. 3 shows a block diagram of the disk controller integrated circuit 220 (FIG. 2). Referring now to FIG. 3, the microprocessor 210 (FIG. 2) communicates with, initializes and maintains control over, the disk controller integrated circuit 220. The microprocessor communicates via bus 222 and interface logic 320 to gain access to the primary internal bus 325. In a similar manner, the host interface 114 accesses the primary internal bus 325 via host interface logic 360. This configuration provides host interface 114 with a communication path to the microprocessor 210 (FIG. 2) and data access to RAM buffer 230 (FIG. 2). The RAM buffer 230 (FIG. 2) can be linked to three data paths, host system interface 114, microprocessor interface 222 or serializer/de-serializer 350. Priority resolving and arbitration is performed by buffer arbitration control 390. Buffer RAM control logic 396 assures that proper address and control signals are sent to the external RAM buffer 230 (FIG. 2) for each buffer data transaction.

As a disk data transfer is initiated, sequencer 340 performs high speed synchronized control of disk data functions. Sequencer 340 obtains its programming instructions from sequencer control RAM 330 through bus 334. Prior to starting a disk operation, microprocessor 210 (FIG. 2) loads sequencer control RAM 330 via bus 222, microprocessor interface logic 320, and primary bus 325. The sequencer 340 relieves the microprocessor from the real-time task of following high speed disk activity while still allowing the microprocessor to pre-define how the disk operation will be performed. Sequencer 340 directly controls disk operations via bus 342 and simultaneously coordinates internal circuit activities via bus 347 and bus 325.

When the processing element 112 send a disk write command, the microprocessor 210 interprets the command and starts the write operation. First, the microprocessor 210 loads a sequencer program into the sequencer control RAM 330 which will cause sequencer 340 to write data from the RAM buffer 230 to the disk 112. Before starting the sequencer, however, the microprocessor 210 instructs the host system interface logic 360 and the buffer arbitration control 390 to transfer the host data from the memory 124 (FIG. 1) over system bus 114, and store the host data into RAM buffer 230. After transferring the data to the RAM buffer 230, the microprocessor 210 starts the sequencer 340. Sequencer 340 first instructs the disk 122, via bus 342, to locate the correct sector for the write operation. After the disk 122 finds the correct sector, the sequencer 340 starts the data transfer by instructing buffer arbitration control 390 to read the previously stored data from RAM buffer 230 and transfer this data to serializer/de-serializer 350. Serializer/de-serializer 350 takes the 8 bit parallel data from bus 325, loads it into a shift register (not shown), and converts it to serial NRZ (non-return to zero) data by shifting the shift register using data clock 355, which is synchronized to the rotating media by the disk 122. The serial data is sent over data line 353 to the disk 122 and to the ECC redundancy generator and comparator 370. The disk records the serial data in the sector designated in the write command, and, simultaneously, the ECC redundancy generator and comparator 370 creates redundancy data as defined by the ECC polynomial being used. Since the ECC redundancy generator 370 was initialized to a known state before data transfer was started, the residual data in the ECC redundancy generator 370, upon completion of the data transfer, will be predictable and unique for a given data input. After transferring all of the data in the RAM buffer 230, sequencer 340 immediately multiplexes the data source for bus 353 from serializer/de-serializer 350 to ECC redundancy generator 370 and starts transferring the redundancy data to the disk for writing into the sector. Data clock 355 continues to clock the ECC redundancy generator 370 to append the redundancy data to the host data already written in the sector.

When a disk read operation is requested by the processing element 112, a sequence of events similar to the above described sequence is initiated, with the order of events and data path essentially reversed. As serial data is read from the requested sector on the disk, clocked into ECC redundancy generator and comparator 370, and clocked into serializer/de-serializer 350, the serial data is shifted into the pre-initialized ECC redundancy generator 370 using the same ECC polynomial used when the data was originally written to the disk. The serial data is concurrently shifted into the serializer/de-serializer and, after each 8 bit byte is assembled, the byte is stored in the RAM buffer 230 via buffer arbitration control 390. After transferring all the sector data, the remaining information in the ECC shift register is compared to the ECC redundancy field that was appended to the data when the sector was written. Should a loss of integrity occur in either the data or ECC redundancy, the recorded and newly generated remainders will not agree. In this event, the ECC redundancy generator and comparator 370 immediately signals the sequencer 340 (using signal 428 described below) via bus 347 to allow the sequencer to take corrective action. When error correction is needed, the reverse of the original ECC polynomial is loaded into the ECC redundancy generator 370 by microprocessor command via bus 382, ECC correction logic 380 and bus 374. The remainder (from the read operation) is then inverted and reverse shifted through the ECC redundancy generator 370 until an error condition is found. Assuming the severity of the error is within the correctable limits of the ECC polynomial, the microprocessor reads the new contents of the ECC redundancy generator 370 via bus 325 and uses this syndrome to correct the defective data stored in the RAM buffer.

Figure 4:
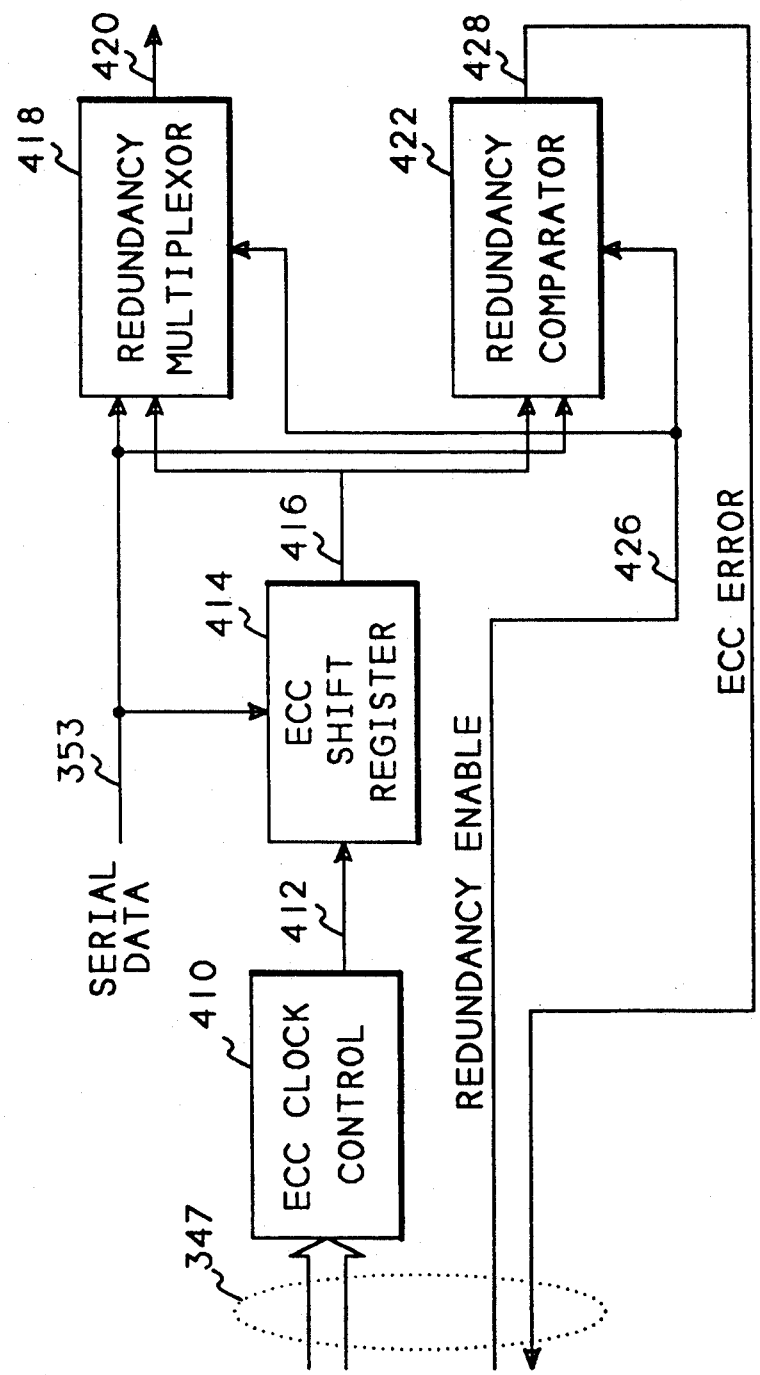
FIG. 4 is a block diagram of the error correction code circuit of FIG. 3.

FIG. 4 shows a block diagram of the ECC redundancy generator and comparator 370 of FIG. 3. Referring now to FIG. 4, serial data 353, either from the serializer on a write or from the disk on a read, is input to the ECC shift register 414 where it is shifted bit by bit while data is being transferred to or from the disk. As the shifting is being performed, the data fed back through an "exclusive or" network between register stages as determined by the ECC polynomial to create the ECC remainder. While the data is being shifted into the ECC shift register 414, it is also being input to the redundancy multiplexor 418. While data is being written to the disk, redundancy enable signal 426 (from sequencer 350 via bus 347) will condition the redundancy multiplexor 418 to gate the serial data 408 to the disk serial data signal 420. After all the data for a sector has been written to the disk, redundancy enable signal 426 conditions the redundancy multiplexor 418 to gate the output 416 of the ECC shift register 414 onto the disk serial data signal 420, so that the ECC remainder can be written to the disk as the redundancy field data.

During a read operation, serial data 408 comes from the disk, and the ECC shift register 414 builds an ECC remainder in the same manner as on a write. However, after all the data has been read from the disk, the redundancy enable signal 426 is used to enable the redundancy comparator 422 to compare the output 416 of the ECC shift register 414 to the disk read serial data 408, which consists of the redundancy data that is being read from the disk. If the redundancy field data from the disk does not match the remainder accumulated in the ECC shift register 414, an ECC error is indicated on the signal 428.

At all times during this process, the clocks to the ECC shift Registers are being controlled by the ECC clock control circuit 410. This circuit controls the ECC clock 412 which is used to shift the data in the ECC shift register 414. By controlling this clock, as will be explained in detail below, the ECC clock control circuit 410 causes the ECC interruption to occur.

Figure 5:
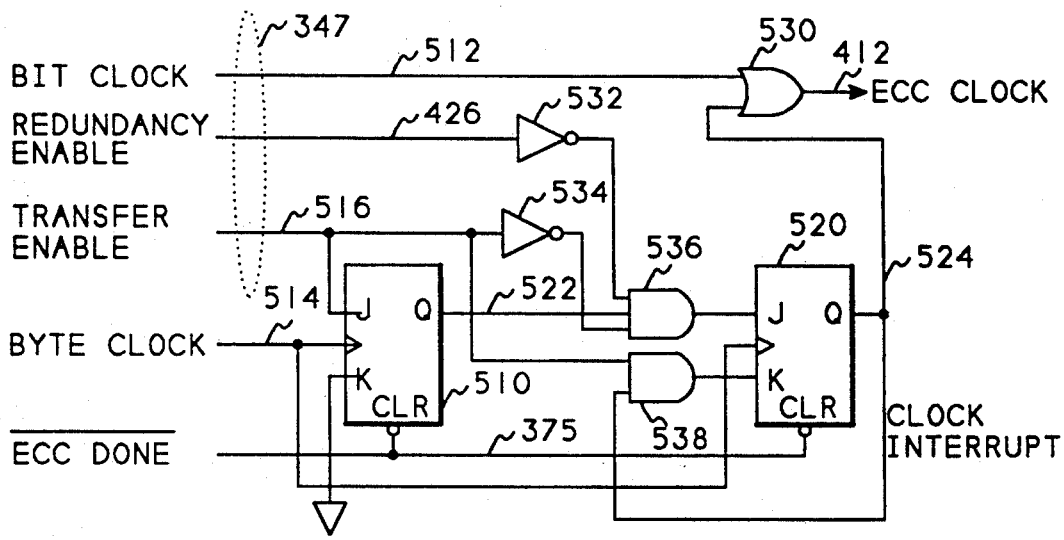
FIG. 5 is a schematic diagram of the ECC clock control circuit of FIG. 4.
Figure 6:
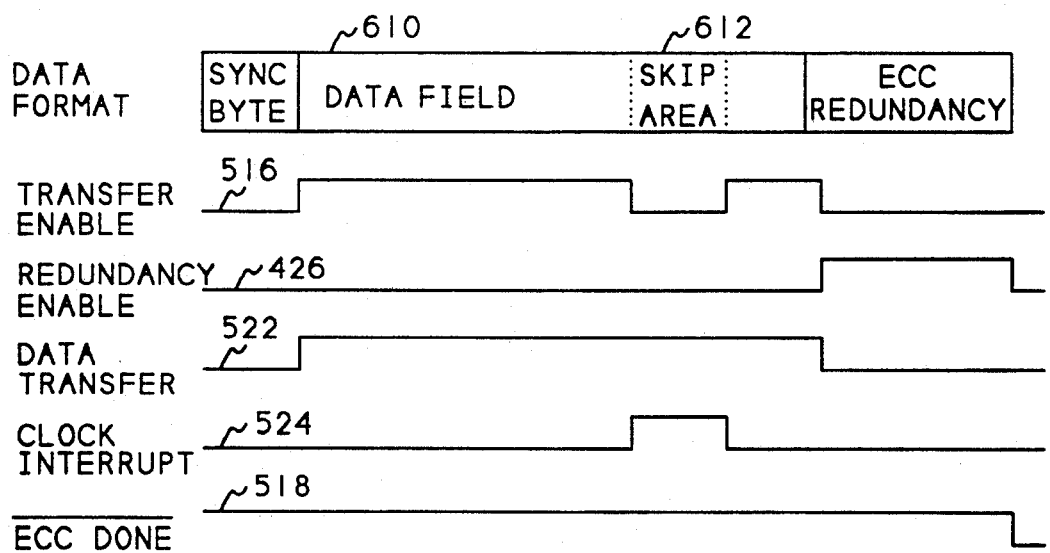
FIG. 6 is a timing diagram showing the relationship of the signals of FIG. 5.

FIG. 5 shows a schematic diagram of the ECC clock control circuit 410 of FIG. 4 and FIG. 6 shows a timing diagram of the circuit in operation. Referring now to FIGS. 5 and 6, diagram 610 illustrates the various information contained in a typical sector, including one or more sync bytes, a data field and ECC redundancy data. For illustration purposes, this sector is shown with a skip area 612. Skip areas can be defined when the media of the device is formatted, and logged in the ID field of each track.

The bit clock 512 cycles once for each bit of data transferred with the disk drive 122 (FIG. 1). The purpose of this circuit is to control the bit Clock 512 to create an interruptable ECC clock 412, which is used to clock the ECC shift register 414 (FIG. 4). The byte clock signal 514 (derived from bit clock 512) cycles once for each byte of data, thus it cycles once for every eight cycles of the bit clock. Transfer enable 516 goes active when the sector data field data starts to transfer, and flip flop 510 then sets causing data transfer signal 522 to go active. This enables one of the inputs to AND gate 536. Transfer enable is inverted by invertor 534 and input to AND gate 536. The third input to AND gate 536 is the redundancy enable signal 426 after it passes through invertor 532.

When the skip area 612 is encountered during the transfer, transfer enable signal 516 drops, which, because of invertor 534 enables AND gate 536 and activates the J input to flip flop 520. Flip flop 520 then activates on the next byte clock transition, activating clock interrupt signal 524 which blocks the ECC clock 412 using OR gate 530, by holding the ECC clock signal 412 constantly high. Since the ECC clock signal 412 is constantly high, the ECC shift register 414 (FIG. 4) will not shift, and therefore accumulation of the ECC remainder is interrupted while the skip area is passing the read/write head of the disk 122.

After the skip area has passed, transfer enable 516 will activate again, and since clock interrupt 524 is high, AND gate 538 is activated, which activates the K input to flip flop 520. Flip flop 520 then resets on the next byte clock transition, deactivating clock interrupt signal 524, which allows the ECC clock 412 to resume cycling. After data transfer is complete, redundancy enable signal 425 goes high and blocks AND gate 536, so the ECC clock is not interrupted during transfer of the ECC redundancy field data. Once the sector has completed transfer of the redundancy data, ECC done signal 518 resets both flip flops to prime the circuit for the next sector.

The circuit works the same way to interrupt ECC remainder generation when the system is bypassing a servo field. While the read/write head is passing a servo field, transfer enable is deactivated, and the ECC clock is held high to interrupt ECC remainder generation.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. An Error Correction Code Interruption System for interrupting the computing of an error correction code remainder while transferring sector data to a rotating media data storage system wherein said sector data is stored by a read/write head, said system comprising:

remainder computation means for accepting sector data during said transfer and for computing an error correction code remainder;

suspension indicating means connected to said read/write head for sending an electrical signal while said remainder computation means is to be suspended;

means connected to said remainder computation means and said suspension indicating means for receiving said electrical signal and interrupting said remainder computation means while said suspension indicating means sends said electrical signal; and means connected to said remainder computation means for transferring said error correction code remainder to said data storage mans after said sector data has been transferred;

whereby said remainder computation means stops computing said error correction code remainder during said interrupting and continues computing said error correction code remainder after said interrupting is discontinued.

2. The system of claim 1 wherein said remainder computation means further comprises: clock means for latching said sector data into said remainder computation means.

3. The system of claim 2 wherein said means for interrupting said remainder computation means comprises: clock control means for interrupting said clock means while said electrical signal is being received.

4. The system of claim 1 wherein said suspension indicating means further comprises: means for sending said electrical signal while said read/write head is passing a media defect.

5. The system of claim 1 wherein said suspension indicating means further comprises: means for sending said electrical signal while said read/write head is reading a servo field.

6. An error correction code interruption apparatus for interrupting the accumulation of an error correction code remainder while transferring sector data from a rotating media data storage system wherein each sector has been previously stored in said rotating media data storage system as sector data followed by a sector error correction code remainder and wherein said sector data and said remainder are transferred by a read/write head, said interruption apparatus comprising:

remainder accumulation means for accepting sector data while said sector data is being transferred, and for computing a second error correction code remainder;

means for transferring said sector data from said read/write head to said remainder accumulation means;

suspension indicating means connected to said read/write head for sending an electrical signal while said remainder accumulation means is to be suspended; and interruption means connected to said means for transferring and said suspension indicating means for interrupting said means for transferring while said suspension indicating means sends said electrical signal;

whereby said remainder accumulation means stops accumulating said second error correction code remainder during said interrupting and continues accumulating said second error correction code remainder after said interrupting is discontinued.

7. The error correction code interruption apparatus of claim 6 wherein said means for transferring comprises: clock means for latching said sector data into said remainder accumulation means.

8. The error correction code interruption apparatus of claim 7 wherein said interruption means comprises: clock control means for interrupting said clock means while said sector data transfer is interrupted.

9. The error correction code interruption apparatus of claim 6 wherein said suspension indicating means further comprises: means for sending said electrical signal while said read/write head is passing a media defect.

10. The error correction code interruption apparatus of claim 6 wherein said suspension indicating means further comprises: means for sending said electrical signal while said read/write head is reading a servo field.

* * * * *